(12) United States Patent
Jerman et al.

(10) Patent No.: US 12,071,513 B2
(45) Date of Patent: Aug. 27, 2024

(54) METHOD FOR THE PREPARATION OF A POLYAMIDE 6 COPOLYMER AND FILAMENTS, FLAME RETARDANT POLYAMIDE 6 COPOLYMER AND COPOLYMER FILAMENTS

(71) Applicants: UNIVERZA V LJUBLJANI, Ljubljana (SI); KEMIJSKI INŠTITUT, Ljubljana (SI)

(72) Inventors: Ivan Jerman, Vransco (SI); Marija Colovic, Ljubljana (SI); Jelena Vasiljevic, Ljubljana (SI); Barbara Simoncic, Sempeter (SI); Alisa Šehic, Trbovlje (SI); Andrej Demšar, Ljubljana (SI)

(73) Assignees: Univerza V Ljubljani, Ljubljana (SI); Kemijski Institut, Ljubljana (SI)

( * ) Notice: Subject to any disclaimer, the term of this patent is extended or adjusted under 35 U.S.C. 154(b) by 792 days.

(21) Appl. No.: 17/255,813

(22) PCT Filed: Jun. 26, 2019

(86) PCT No.: PCT/EP2019/066958
§ 371 (c)(1),
(2) Date: Dec. 23, 2020

(87) PCT Pub. No.: WO2020/002403
PCT Pub. Date: Jan. 2, 2020

(65) Prior Publication Data
US 2021/0284799 A1    Sep. 16, 2021

(30) Foreign Application Priority Data
Jun. 27, 2018 (EP) .................................. 18180251

(51) Int. Cl.
*C08G 69/42* (2006.01)
*C08G 69/14* (2006.01)
*C08G 69/16* (2006.01)
*C08G 69/18* (2006.01)
*C08K 5/5313* (2006.01)
*C08L 77/02* (2006.01)
*D01F 6/80* (2006.01)

(52) U.S. Cl.
CPC ............. *C08G 69/18* (2013.01); *C08G 69/14* (2013.01); *C08G 69/16* (2013.01); *C08G 69/42* (2013.01); *C08K 5/5313* (2013.01); *C08L 77/02* (2013.01); *D01F 6/80* (2013.01)

(58) Field of Classification Search
None
See application file for complete search history.

(56) References Cited

U.S. PATENT DOCUMENTS

| | | | | |
|---|---|---|---|---|
| 3,382,195 A | * | 5/1968 | Gilch | C08G 69/18 521/122 |
| 3,583,981 A | | 6/1971 | Nashu | |
| 4,111,869 A | * | 9/1978 | Puffr | C08G 69/16 528/319 |
| 4,310,659 A | * | 1/1982 | Yates | C08G 69/16 526/71 |
| 5,357,031 A | | 10/1994 | Miess et al. | |
| 2013/0136911 A1 | | 5/2013 | Bender et al. | |

FOREIGN PATENT DOCUMENTS

| | | |
|---|---|---|
| CN | 103328558 A | 9/2013 |
| CN | 104211954 A | 12/2014 |
| CN | 106675007 A | 5/2017 |
| EP | 0578164 A | 1/1994 |
| WO | 2009/079499 A1 | 6/2009 |
| WO | 2012/080403 A1 | 6/2012 |

OTHER PUBLICATIONS

International Search Report and Written Opinion issued by WIPO for corresponding International Patent Application No. PCT/EP2019/066958 mailed on Aug. 29, 2019.
First Office Action and Search Report issued Nov. 7, 2022, for corresponding Chinese Patent Application No. 201980043429X.
R. Mateva et al.; On the Behavior of Organophosphorus Lactam Derivatives during Anionic Polymerization of c-Caprolactam; Sofia Technological University, Department of Plastics; Journal of Polymer Science; 1992; pp. 1449-1462; vol. 30.

* cited by examiner

*Primary Examiner* — David J Buttner
(74) *Attorney, Agent, or Firm* — Renner, Otto, Boisselle & Sklar, LLP

(57) ABSTRACT

The invention relates to a method for preparation of a polyamide 6 copolymer, characterised in that a copolymerization reaction is carried out between: o at least one caprolactam of formula (I): o at least one caprolactam, named substituted caprolactam, in which at least one of the carbon atoms is covalently linked to at least one A moiety, said A moiety being selected from the group formed of: # moieties comprising at least one group of formula: (A) #moieties comprising at least one group of formula: (B) # moieties comprising at least one group of formula: (C) The invention also relates to a polyamide 6, to polyamide 6 filaments and filaments yarns.

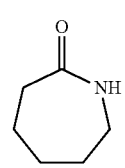

(I)

11 Claims, 4 Drawing Sheets

Figure 1:
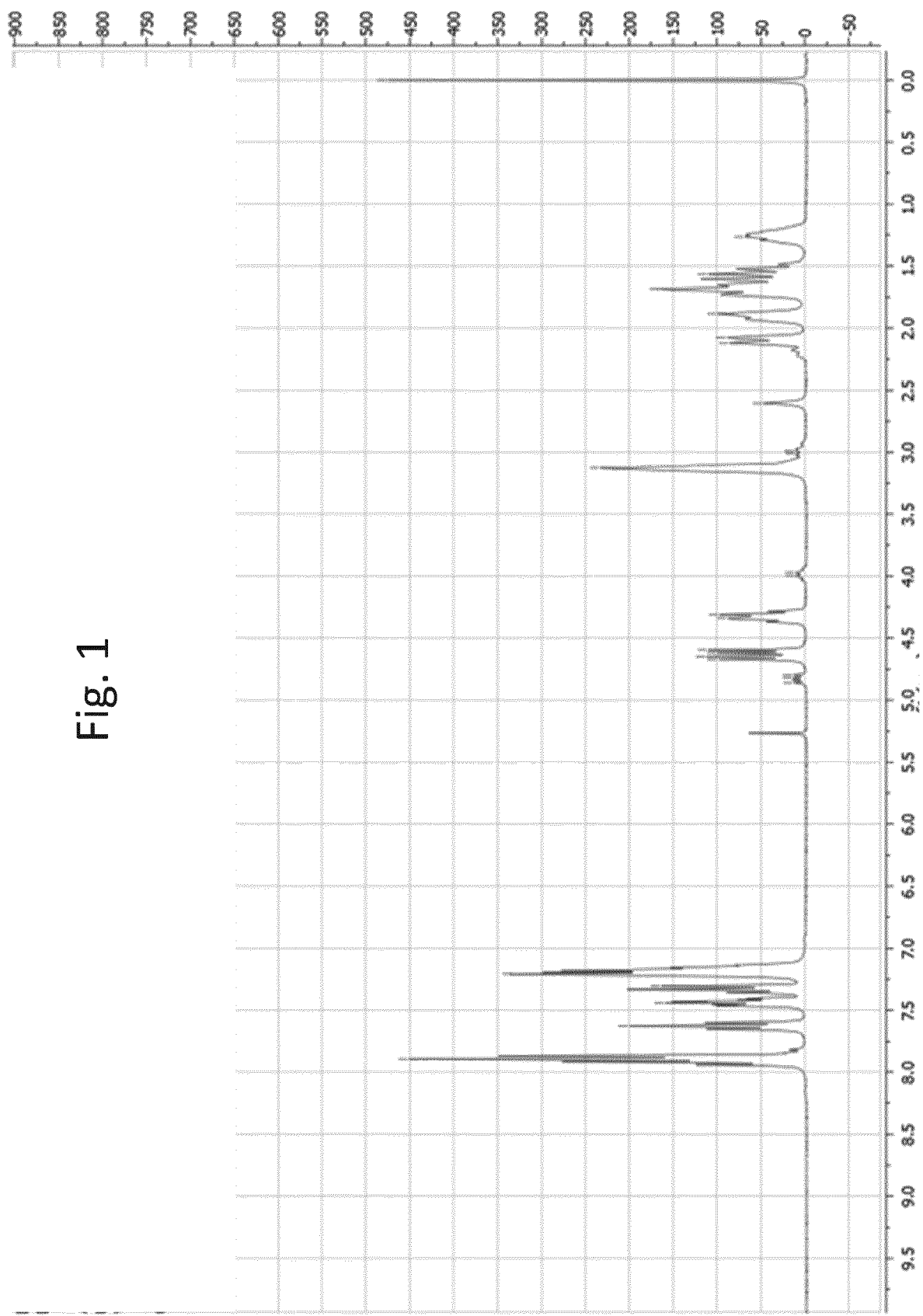

METHOD FOR THE PREPARATION OF A POLYAMIDE 6 COPOLYMER AND FILAMENTS, FLAME RETARDANT POLYAMIDE 6 COPOLYMER AND COPOLYMER FILAMENTS

This application is a national phase of International Application No. PCT/EP2019/066958 filed Jun. 26, 2019 and published in the English language, which claims priority to EP 18180251.3 filed Jun. 27, 2018, both of which are hereby incorporated herein by reference.

The invention relates to a method for the preparation of a polyamide 6 copolymer. It relates to a polyamide 6 copolymer thus obtained, to the use thereof for the production of filaments or fibers of polyamide 6, and to filaments and filaments yarns of polyamide 6 thus obtained.

The invention relates to the production process of recyclable flame retardant (FR) polyamide 6 fibres with the incorporated ε-caprolactam based flame retardant functionalised comonomers which enables a closed loop recycling. It can be used in the field of polyamide 6 technical textiles and engineering plastics which represent the largest and the fastest-growing segments of the global polyamide market.

Throughout the text, the term "polyamide 6" or "PA6" designates any polyamide comprising repeating units, named polyamide 6 repeating units, of formula:

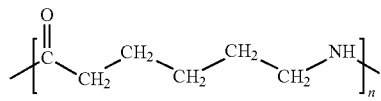

in which n designates the number of repeating units of said polyamide.

Throughout the text, the expression "at least substantially" indicates, in a conventional manner, that a structural or functional feature should not be understood to be marking a sudden discontinuity, which would have no physical sense, but covers not only this structure or this function but also slight variations in this structure or this function which, in the technical context in question, produce an effect of the same nature if not of the same degree. Moreover, the expressions "including/comprising a/one" are synonyms for "including/comprising at least one".

Polyamide 6 (PA6) is one of the key engineering polymers with excellent mechanical properties and resistance which enable its global production and wide use in the industrial and domestic plastic manufacturing. Furthermore, PA6 has already become one of the most important raw materials for production of textile fibres because of the excellent processing properties, low moulding shrinkage as well as low cost and simple processing. Accordingly, the global market of polyamide engineering plastics and fibre was valued at USD 25.14 Billion in 2016 and is projected to grow steadily and reach USD 30.76 Billion by 2021. Whereas the PA6 plastics represent the largest segment of the global polyamide market, the PA6 textile fibre application segment is the fastest-growing. Furthermore, PA6 has an exceptional feature, i.e. its chemical recyclability back to monomer ε-caprolactam which classifies PA6 as a "sustainable polymer", and consequently dramatically enhances its re-usability and added-value. Chemical recyclability of PA6 represents an ideal solution for the preservation of the limited petroleum resources, the reduction of the global environmental pollution, and the establishment of the Circular Economy Strategy.

In spite of the widespread use of PA6 in various economic areas, a problem associated with the flammability of PA6 fibres has not been solved yet. Namely, PA6 has a very hazardous drawback that is its inherent flammability followed by a rapid burning with intensive flammable melt-dripping and a release of the toxic smoke, which may represent a great risk and danger for precious lives and material goods. Due to the very high number of fire deaths and economic losses to material goods, society's and industry's demands for fire safety materials are increasing rapidly. Despite a quite successful production of the flame retardant PA6 moulding plastic materials, development of the flame retardant (FR) PA6 textile fibres remained a challenging scientific problem and the commercially available flame retardant (FR) PA6 textile fibres still does not exist.

One of the main problems in the production of flame retardant polyamide 6 fibres is that FR loadings higher than 15 wt % are required for the achievement of the efficient flame retardancy but these high loadings are unacceptable for the textile fibres because of the impaired spinnability as well as tensile properties. This represents the most important limitations in the production of flame retardant polyamide 6 fibres in comparison with PA6 bulk plastic materials. Therefore, this background is focused only on the field of the FR PA6 fibres.

Another important problem includes the agglomeration of FR additives in the PA6 matrix when use the "melt-compounding approach" in the melt-spinning process which represents the most common strategy for production of the flame retardant polyamide 6 composite fibres. Namely, high melt reactivity and poor compatibility with flame retardants due to the strong intermolecular hydrogen bonds between PA6 polymer chains cause agglomeration of flame retardant additive species into the microsized particles with low dispersion and non-uniform distribution in the PA6 matrix. The flame retardant action of the flame retardant species entrapped in the micro-sized agglomerates is inhibited because of the inability of the entrapped FR molecules in the agglomerate to actively participate in the flame retarding action. Namely, the flame retarding action occurs at the nanoscopic level. In the case of the micro-sized aggregates, only the outermost molecules can efficiently participate in the flame retarding action. Thus, in the case of the aggregated flame retardants, increased weight percent loading of the flame retardant additive is unavoidable for the efficient flame retardancy. Furthermore, the micro-sized flame retardant agglomerates impair spinnability of the PA6 composite filaments since they cause clogging of the filters and spinnerets at higher FR additive loadings. Agglomerates also significantly reduce physical and mechanical properties of the fibres. Consequently, the loadings of flame retardant additives that are acceptable for the continuous melt-spinning process provide only poor flame retardant effect.

To solve these problems, two main approaches in the melt-spinning process of the PA6/FR composite fibres have been introduced: (i) the use of the combinations of different flame retardant additives with the synergistic action at low concentrations in the melt-compounded PA6/FR composite masterbatches, and (ii) the in situ polymerization of ε-caprolactam in the presence of the FR additives. Among flame retardant additives, halogen-free phosphorus (P) and nitrogen (N) based flame retardants, inorganic FRs as well as their combinations have been actively investigated. The most common halogen-free flame retardant additives in commercial use for PA6 are aluminum diethylphosphinate, aluminum hypophosphite, melamine cynurate and other melamine products (melamine pyrophosphate, melamine polyphosphate), magnesium hydroxide and nanoclays. Furthermore, new phosphorous compounds, such as cyclotriphosphazenes and 9,10-dihydro-9-oxa-phosphaphenanthrene-10-oxide (DOPO) derivates were recently developed and applied as flame retardant additives for bulk PA6.

US 2013/0136911 A1 discloses the production of the flame retardant fibres and filaments made of a polymer blend having the following composition: 60 wt % to 90 wt % of polyamide 66 (PA66), 6 wt % to 28 wt % of PA6 and 4 wt % to 12 wt % of at least one DOPO-based FR made of a polycondensate. The polymer fibre has mechanical properties required for the textile production.

CN 104 211 954 describes a preparation method of a halogen-free flame-retardant nylon 66 polymer. A DOPO derivative, hexamethylenediamine and water are mixed to form a salt solution. Then said salt, caprolactam and desalinated water are formulated into a nylon 66 salt solution.

WO 2009/079499 describes a flame retardant polyester fiber comprised of a polymer formed of from 50 mol % to 99.9 mol % of a trimethylene terephthalate component and from 0.1 mol % to 50 mol % of a phosphorous containing component.

WO 2012/080403 describes thermoplastic molding compositions comprising a thermoplastic polyamide, melamine cyanurate, an organic phosphorus compound and a fibrous filler.

Furthermore, Xiao et al. (CN106675007 (A)) prepared flame retardant polymide 6 by introducing DDP as a reactive additive during a process of polymerising of caprolactam into PA6. Before added into polymerisation, DDP was reacted with decamethylene diamine to form the DDP salt solution and to get structure containing amidogen and carboxyl at each end. The synthesised flame retardant polyamide 6 includes a polyamide chain segments and a DOPO-based FR chain segments. The composites contain 3 wt % to 9 wt % DDP. From the composites, the fibres were prepared by melt spinning.

The crucial problem arising from the incorporation of DDP or DDP salt into the flame retardant copolyamide is a significant hindrance of chemical recyclability of flame retardant polyamide 6 back to monomer ε-caprolactam which represents an important drawback of these preparation methods. The present invention relates to a new process of the preparation of flame retardant polyamide 6 composite fibres and fabrics which preserves the closed loop recycling of PA6. This new approach and developed process represent a unique strategy also for the production of engineering plastics.

The quality of flame retardant polyamide is described by UL94 protocol that is a standard for safety of flammability of plastic materials for parts in devices and appliances testing which involves testing using Bunsen burner flame and classification in four different stages follows:
- HB—slow burning of sample clamped horizontally (with self-extinction),
- V-2—extinction of a sample clamped vertically within 30 seconds,
- V-1—extinction of a sample clamped vertically within 30 seconds without burning dripping of molten plastics material, and
- V-0—extinction of a sample clamped vertically within 10 seconds.

In this context, the invention thus aims generally to propose a method for the preparation of a flame retardant polyamide 6 copolymer and to do so within economic conditions compatible with an operation on an industrial scale.

For this purpose, the invention relates to a method for the preparation of a polyamide 6 copolymer, characterised in that a copolymerization reaction is carried out between:

at least one caprolactam of formula (I):

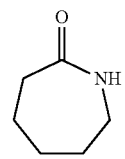

(I)

at least one caprolactam, named substituted caprolactam, having a cycle formed of six carbon atoms and one nitrogen atom in which one of said carbon atoms, named $C_2$, is linked by a double bond to an oxygen atom and at least one of said carbon atoms that is distinct from said $C_2$ is covalently linked to at least one A moiety, said A moiety being selected from the group formed of:

moieties comprising at least one group of formula (II):

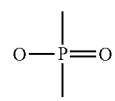

(II)

moieties comprising at least one group of formula (III):

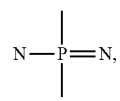

(III)

moieties comprising at least one group of formula (IV):

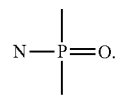

(IV)

The inventors have unexpectedly discovered that it is possible to prepare a polyamide 6 copolymer from a substituted caprolactam.

Even more unexpectedly, the inventors have discovered that it is possible to prepare a polyamide 6 copolymer from such a substituted caprolactam that bears flame retardant groups and that said polyamide 6 copolymer is recyclable as it can be transformed back to caprolactam of formula (I).

In some advantageous embodiments in accordance with the invention, said A moiety is selected from the group formed of phosphonates, phosphinates, phosphonamidates, phosphazenes and mixtures thereof.

In some advantageous embodiments in accordance with the invention, said substituted caprolactam is of formula (V):

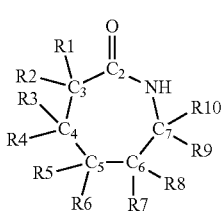

in which:
C2, C3, C4, C5, C6, C7 designate carbon atoms,
R1, R2, R3, R4, R5, R6, R7, R8, R9, R10 are groups so that at least one of R1 to R10 comprises said A moiety and the others R1 to R10 are chosen from the group formed of H, hydroxy group (OH), nitrile, halogens, alkyl groups containing less than 5 carbon atoms, aryls containing less than 10 carbon atoms, halocarbons containing less than 5 carbon atoms, alkoxy containing less than 5 carbon atoms and hydrocarbons containing less than three oxygen atoms and less than 5 carbon atoms.

Said caprolactam is of formula (V) can also be represented as in formula (VIII) below in which R and R' of C3 correspond to R1 and R2, R and R' of C4 correspond to R3 and R4, R and R' of C5 correspond to R5 and R6, R and R' of C6 correspond to R7 and R8 and R and R' of C7 correspond to R9 and R10:

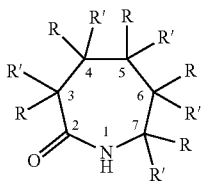

In some advantageous embodiments in accordance with the invention, said substituted caprolactam is of formula (VI):

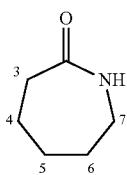

in which 3, 4, 5, 6, 7 relate to the number of each of the carbon atoms of the cycle of said substituted caprolactam and at least one of said carbon 3 to 7 is linked to at least one A moiety (not shown in figure VI).

In some advantageous embodiments in accordance with the invention, A moiety comprises at least one pentavalent phosphorus atom.

In some particularly advantageous embodiments in accordance with the invention, said caprolactam is substituted with an A moiety comprising at least one group of formula (X):

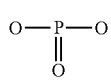

In some particularly advantageous embodiments in accordance with the invention, said caprolactam is substituted with an A moiety comprising at least one group of formula (IX):

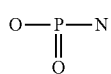

In some particularly advantageous embodiments in accordance with the invention, said caprolactam is substituted with an A moiety containing a 9,10-dihydro-9-oxa-10-phosphaphenanthrene-10-oxide (DOPO) moiety. In some advantageous embodiments in accordance with the invention, said substituted caprolactam is of formula (VII):

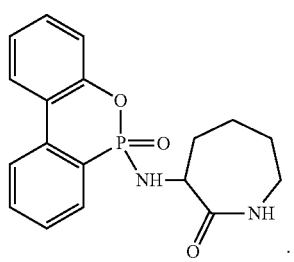

In some advantageous embodiments in accordance with the invention, prior to carrying out said copolymerization reaction, said substituted caprolactam is prepared from a α-amino-ε-caprolactam.

Said copolymerization reaction can be carried out in an atmosphere containing at least one inert gas such as nitrogen gas ($N_2$), or at least one noble gas, or only noble gas(es) or only nitrogen gas ($N_2$). In some advantageous embodiments in accordance with the invention, said copolymerization reaction is carried out in an atmosphere containing at least one gas chosen from the group formed of noble gases, inert gases and mixtures thereof, particularly chosen from the group formed of helium (He), neon (Ne), argon (Ar), krypton (Kr), xenon (Xe) and mixtures thereof. In some advantageous embodiments in accordance with the invention, said copolymerization reaction is carried out in argon atmosphere.

In some advantageous embodiments in accordance with the invention, said copolymerization reaction is carried out at a temperature between 170° C. and 300° C., and more particularly between 190° C. and 260° C., for example between 210° C. and 250° C.

In some advantageous embodiments in accordance with the invention, said copolymerization reaction is carried out at a temperature between 170° and 300° C. for at least 30 minutes, particularly for at least 1 hour, more particularly for at least 3 hours, and for example between 4 hours and 10 hours.

In some advantageous embodiments in accordance with the invention, said copolymerization reaction is carried out at a pressure that is above atmospheric pressure, and more particularly at autogenous pressure in an autoclave.

In some advantageous embodiments in accordance with the invention, said copolymerization reaction is carried out with 80% to 95% by weight of caprolactam of formula (I) and 5% to 20% of said substituted caprolactam compared to the total mass of said caprolactam of formula (I) and said substituted caprolactam.

In some advantageous embodiments in accordance with the invention, said copolymerization reaction is carried out with addition of an initiator of said copolymerization reaction. In some advantageous embodiments in accordance with the invention, said polymerization initiator is chosen from the group formed of water, aminocaproic acid, sodium &-caprolactamate and mixtures thereof. In some advantageous embodiments in accordance with the invention, said copolymerization reaction is carried out with water as an initiator of said copolymerization reaction.

The invention also relates to a polyamide 6 copolymer containing at least 8% by weight of repeating units, named polyamide 6 substituted repeating units, of formula:

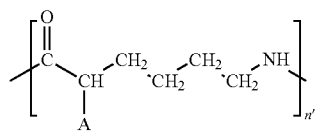

in which n' designates the number of said substituted repeating units in said polyamide 6 copolymer,
compared to the total mass of said polyamide 6 copolymer, as determined by inductively coupled plasma mass spectrometry (ICP-MS),
said A moiety being selected from the group formed of:
moieties comprising at least one group of formula (II):

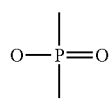

moieties comprising at least one group of formula (III):

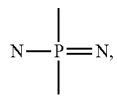

moieties comprising at least one group of formula (IV):

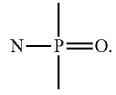

In some advantageous embodiments in accordance with the invention, said polyamide 6 copolymer has a number average molecular weight of from 25 000 g/mol to 30 000 g/mol as determined by size exclusion high-pressure liquid chromatography (SEC-HPLC).

In some advantageous embodiments in accordance with the invention, said polyamide 6 copolymer has polyamide 6 repeating units and polyamide 6 substituted repeating units arranged as a random copolymers, as an alternating copolymers, as block copolymers, as graft copolymers or copolymers thereof. In some advantageous embodiments in accordance with the invention, said polyamide 6 copolymer is formed of filaments (or "fibres").

In some advantageous embodiments in accordance with the invention, said polyamide 6 copolymer is formed of filaments yarns.

The invention also relates to a method for the preparation of filaments of a polyamide 6 copolymer, characterised in that:
a polyamide 6 copolymer containing at least 8% by weight of repeating units, named polyamide 6 substituted repeating units, of formula:

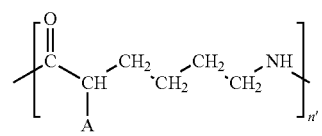

in which n' designates the number of said substituted repeating units in said polyamide 6 copolymer,
compared to the total mass of said polyamide 6 copolymer, as determined by inductively coupled plasma mass spectrometry (ICP-MS), said A moiety being selected from the group formed of:
moieties comprising at least one group of formula (II):

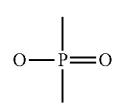

moieties comprising at least one group of formula (III):

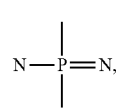

moieties comprising at least one group of formula (IV):

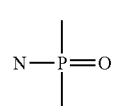

is selected,
a filament formation step chosen from the group formed of melt-spinning and extrusion of said polyamide 6 copolymer is carried out.

According to the present invention, the production process of flame retardant polyamide 6 bulk copolymer, composite filament yarns and textile fabrics is described. The process is conducted while preserving the closed loop chemical recycling of flame retardant polyamide 6 back to monomer ε-caprolactam (CL). The process comprises the advanced synthesis of novel FR functionalised ε-caprolactam comonomers (FR-CL), copolymerisation of PA6 using CL- and FR-CL-of different ratios, granulation of flame retardant polyamide 6 composites and melt spinning into the filament yarns which are additionally knitted into the knit fabrics. In addition the present invention describes the novel flame retardant polyamide 6 copolymers, composite filament yarns and textile fabrics, which have been produced using the innovative process.

The flame retardant polyamide 6 copolymer material provided by the invention is characterized by instantaneous flame extinguishment, and increased thermal stability. Good physical and chemical properties of the flame retardant polyamide 6 copolymers meet the processing characteristics of the melt-spinning, injection moulding and extrusion processes and are suitable either for in situ incorporation of different additives or by melt-compounding.

The flame retardant polyamide 6 copolymer material provided by the invention enables the production of flame retardant textiles for different technical applications, in particularly protective and home textiles and textiles for construction, transport vehicles and aircraft industry, and agro industries.

Furthermore, the flame retardant polyamide 6 copolymer material processed by injection moulding or extrusion is particularly useful for the engineering thermoplastic materials, and more particularly sheets, flexible films, rods and tubes which are able to meet the fire safety requirements. Examples of the preferred applications are electrical and electronics components, cable holders, automotive components, clamps and channels in the rail, aviation, shipbuilding.

The preservation of the chemical recycling of flame retardant polyamide 6 copolymer material provided by the invention enables "closing the loop" of product lifecycles through greater recycling and re-use, and bring benefits for both the environment and the economy.

During polymerization process in which unmodified ε-caprolactam is polymerized, copolymers presented above can be used as flame retardant additives.

The invention also relates to a composition comprising a polyamide 6 copolymer according to the invention and phosphates, phosphonates, phosphinates, phosphonamidates and other phosphorous based molecules as flame retardant additives. In some advantageous embodiments in accordance with the invention, said additives is chosen from the group formed of 6H-dibenz[c,e][1,2]oxaphosphorin,6'6-(1,2-phenethyl)bis-,6'6-dioxide (DOPO2-phenethyl) of formula:

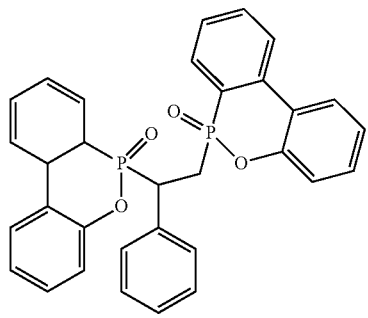 [SMILES: O=P1(CC(c2ccccc2)P2(=O)Oc3ccccc3C3C=CC=CC32)Oc2ccccc2-c2ccccc21]

and 6H-dibenz[c,e][1,2]oxaphosphorin,6'6-(1,2-naphtalene)bis-,6'6-dioxide (DOPO2-naphtalene) of formula:

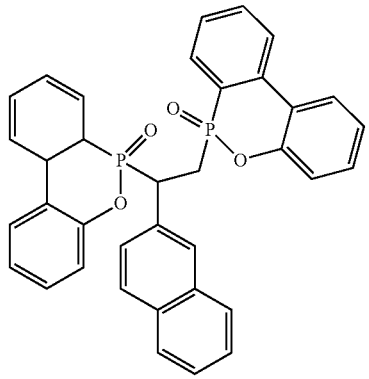 [SMILES: O=P1(CC(c2ccc3ccccc3c2)P2(=O)Oc3ccccc3C3C=CC=CC32)Oc2ccccc2-c2ccccc21]

Using such additives enables to increase even more flame retardant properties of said composition comprising a polyamide 6 copolymer according to the invention. Such a composition comprising a polyamide 6 copolymer according to the invention and at least such an additive can be named "nanocomposite" in which said polyamide 6 copolymer forms a matrix of said nanocomposite and said additive act as a filler of said nanocomposite. Said additives do not copolymerize or react with said polyamide 6 copolymer.

The invention also relates to a preparation method of a polyamide 6 copolymer in situ in the presence of the 6H-dibenz[c,e][1,2]oxaphosphorin,6'6-(1,2-phenethyl)bis-, 6'6-dioxide (DOPO2-phenethyl) and 6H-dibenz[c,e][1,2] oxaphosphorin,6'6-(1,2-naphthalene)bis-,6'6-dioxide (DOPO2-naphthalene), a preparation method of filaments of polyamide 6 polymer and copolymer nanocomposite, filaments and filaments yarns of polyamide 6 polymer and copolymer nanocomposite, which are characterised in combination by all or some of the features mentioned above or below.

In some advantageous embodiments in accordance with the invention, said polymerization reaction is carried out with 85% to 95% by weight of caprolactam of formula (I), 10% to 0% by weight of said substituted caprolactam and up to 15%(0% to 15%) by weight of said additives (such as DOPO2-phenethyl and DOPO2-naphtalene) compared to the total mass of said caprolactam, said substituted caprolactam and said DOPO2-phenethyl and DOPO2-naphtalene.

In some advantageous embodiments in accordance with the invention, said polymerization of caprolactam and substituted caprolactam in situ in the presence of the DOPO2-phenethyl and DOPO2-naphtethyl alone or in the mixture reaction of is carried out at a temperature between 170° C. and 300° C. for at least 30 minutes, particularly for at least 1 hour, more particularly for at least 3 hours, and for example between 6 hours and 10 hours.

The invention also relates to a preparation method of a polyamide 6 copolymer, a polyamide 6 copolymer, a preparation method of filaments of polyamide 6 copolymer, filaments and filaments yarns of polyamide 6 copolymer, which are characterised in combination by all or some of the features mentioned above or below.

Figure 2:
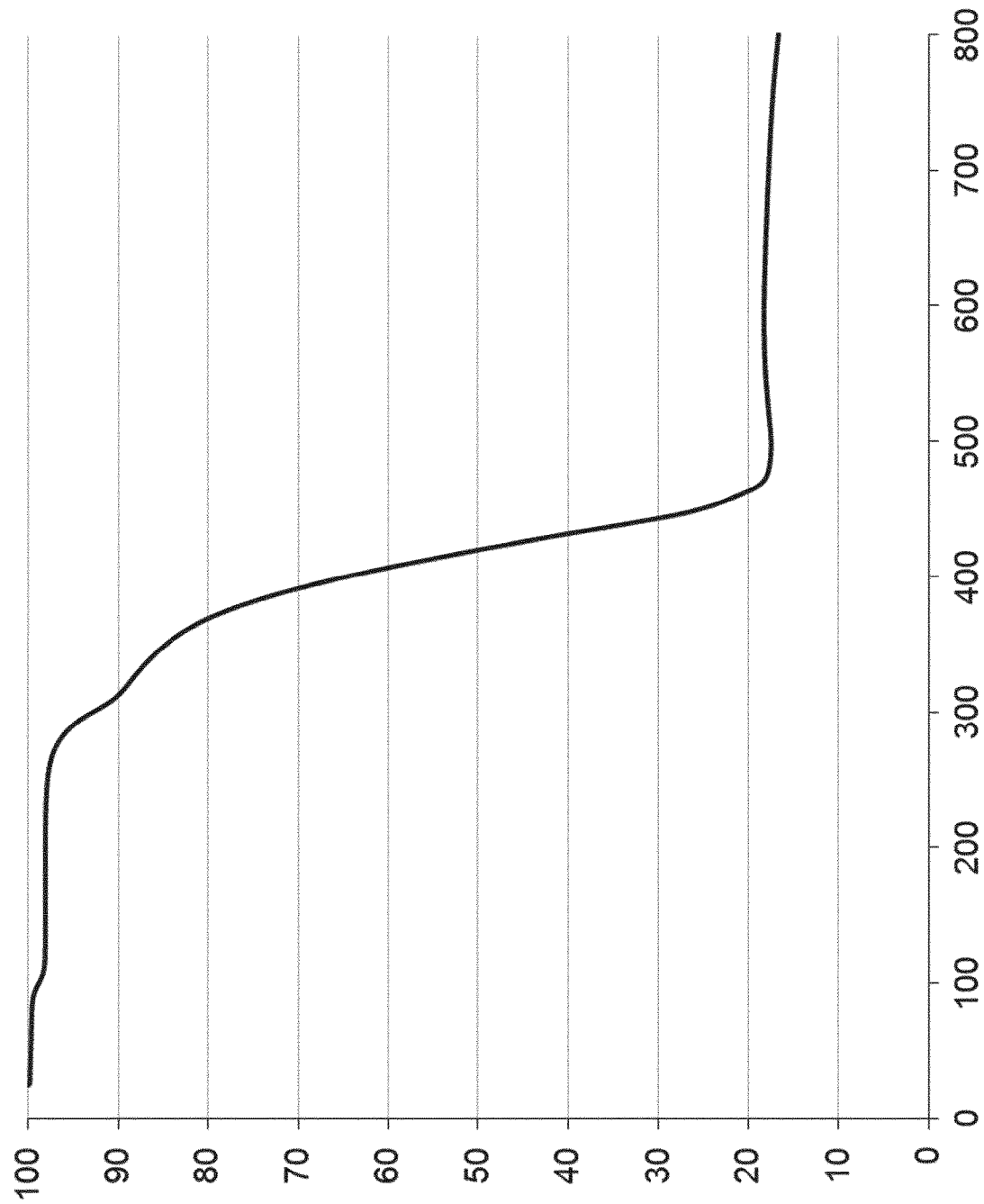
Figure 3:
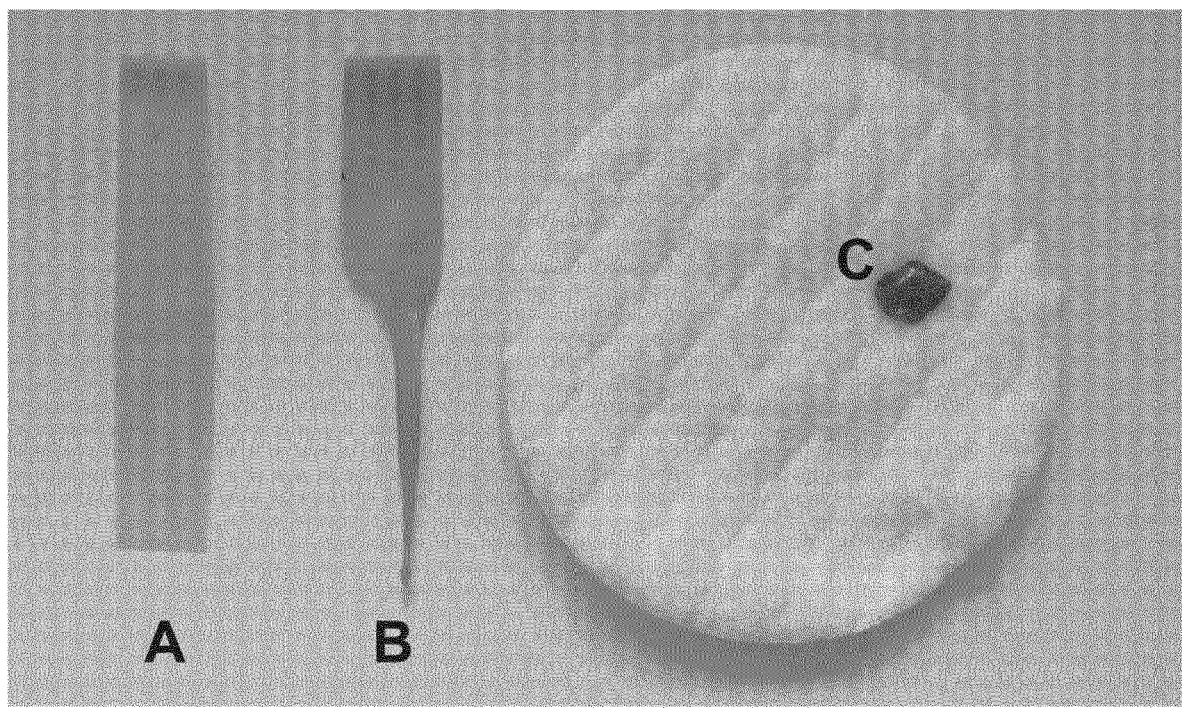
Figure 4:
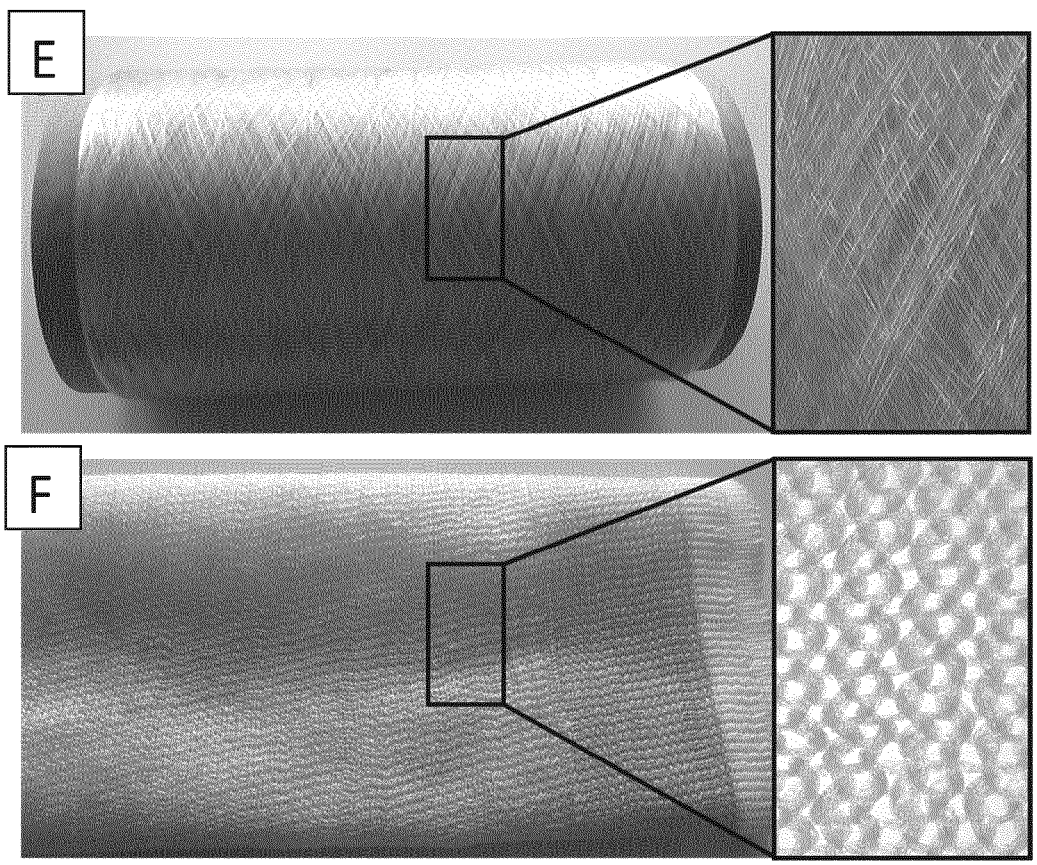

Other aims, features and advantages of the invention will become apparent upon reading the following description given by way of non-limiting example and which makes reference to the attached figures in which:

FIG. 1 is a $^1$H NMR spectrum of DOPO-CL phosphonamidate made in CDCl$_3$ on 300 MHz NMR spectrometer, FIG. 2 is a thermogravimetric curve of DOPO-CL phosphonamidate FR monomer in argon atmosphere, FIG. 3 is a sheet specimen of a FR PA6 copolymer material in accordance with the invention before (A) and after (B and C) the UL94 standard test, FIG. 4 shows photographs of FR PA6 copolymer in accordance with the invention in the form of multifilament yarn (E) and knit-fabric (F).

NMR spectrum of FIG. 1 was obtained with a Varian® NMR spectrometer sold under the name Unity Inova 300® by LABX® (Midland, Canada). FIG. 1 shows the intensity of the signal as a function of the chemical shift in ppm. Chemical shift identification of NMR spectrum of FIG. 1 is:
1H-NMR (CDCl$_3$, 300 MHz): 7.85-7.95 ppm (m, 3H); 7.55-7.67 ppm (t, 1H); 7.37-7.5 ppm (m, 1H); 7.27-7.37 ppm (m, 1H); 7.10-7.25 ppm (m, 3H); 4.67 ppm (d, 1H); 4.60 ppm (d, 1H); 4.34 ppm (m, 2H); 4.31 ppm (m, 2H); 3.13 ppm (m, 2H); 2.12 ppm (s, 2H); 2.08 ppm (s, 2H); 1.93 ppm (m, 1H); 1.88 ppm (m, 1H); 1.73 ppm (m, 1H); 1.69 ppm (m, 1H); 1.65 ppm (m, 1H); 1.60 ppm (m, 1H); 1.56 ppm (m, 1H); 1.49 ppm (m, 1H); 1.26 ppm (m, 1H); 1.25 ppm (m, 1H), in which "s" is for singlet, "d" is for doublet, "t" is for triplet and "m" is for multiplet.

FIG. 2 is a curve obtained by thermal gravimetric analysis (TGA) of DOPO-CL phosphonamidate FR monomer in argon atmosphere. FIG. 2 shows the mass percentage (%) as a function of the temperature in ° C. (0° C. to 800° C.).

In accordance with this invention, flame retardant polyamide 6 thin films and sheets, fibres and textiles, can be prepared from flame retardant polyamide 6 copolymers obtained in ring-opening (hydrolytic or anionic) copolymerization reaction of ε-caprolactam (CL) and flame-retardant modified ε-caprolactam (FR-CL). Bonding type of flame retardant functionality on the caprolactam ring is responsible for obtaining various FR-CL co-monomers: caprolactam based phosphates, phosphonates, phosphinates, phosphonamidates and other phosphorous based molecules. Including 10 wt % of FR-CL phosphonamidate in the copolymerisation process, where phosphorous content in the copolymerisation mixture is between 0.01 and 3%, enables obtaining flame retardant polyamide 6 copolymer with relative viscosity of 2.0 Pa·s (according to DIN 51562 of year 1999). Obtained copolymer is suitable for extrusion and melt-spinning process for production of filament yarns, which can be knitted in fabrics. In addition, it was found that high weight percentage FR PA6 contains small fraction of low molecular weight copolymers and therefore can be used as reactive flame retardant additive for in-situ polymerization process of ε-caprolactam or in the melt-compounding process with PA6 of different viscosities.

This product is preferably made of ε-caprolactam and flame retardant functionalized ε-caprolactam that, once completely polymerized, enables production of fibre materials and textiles of a sufficient strength, and instantaneous self-extinguishing properties.

The process according to this invention therefore consist of several independent steps of flame retardant polyamide 6 fibres preparation; synthesis of monomers, copolymerization of ε-caprolactam and flame retardant functionalized ε-caprolactam, which enables preparation of flame retardant polyamide 6 copolymers of proper viscosity used for and fibres production execution of the following interrelated steps:

step (i) flame retardant modification of ε-caprolactam is achieved by using different also ε-caprolactam based precursors (sugars, L-lysine, α-amino-ε-caprolactam, α-bromo-ε-caprolactam, etc., see Table 1). Precursors for flame retardant caprolactam (FR-CL) synthesis, preferably ε-caprolactam based precursors, are obtained from bio-sources or synthesised from precursors obtained from bio-sources. ε-caprolactam based precursors for FR-CL synthesis could be —OH, —X (X=Cl, Br, I) or —NH$_2$ functionalized ε-caprolactam analogues where functional groups are located also on other than α-position (see Table 1). Preference is on amino group reaction for comonomer obtaining. In different embodiments different phosphorus compounds i.e. different dialkylphosphites can be used for phosphonamidates comonomer obtaining. FR functionalization is made in such a way that does not influence the polymerization reaction. Polymerizable part of FR molecule is ε-caprolactam and phosphorous containing part of the molecule stays covalently attached to PA6 polymer chain. Preferably, Atherton-Todd reaction of α-amino-ε-caprolactam with dimethylphosphite, dibenzylphosphite, diphenylphosphite or DOPO is used for obtaining caprolactam based phosphonamidates.

step (ii) copolymerization of ε-caprolactam and ε-caprolactam flame retardant analogue (FR-CL) without or with the addition of DOPO2-phenethyl and DOPO2-naphthalene alone and in the mixture in different molecular ratios, FR-CL in different molecular ratios with addition of water and/or amino caproic acid and/or sodium ε-caprolactamate in order to achieve proper molecular weight and assure relative viscosity equals to 2.0 proper for melt spinning process. This initiator is only limitedly integrated into polymer structure and can thus be present in limited quantities;

step (iii) masterbatch production in order to tune final copolymer FR properties;

step (iv) melt spinning process of flame retardant polyamide 6 copolymer for flame retardant PA6 fibres production used in different technical textile products.

In the preferred embodiment of the invention, in step (i) precursor for FR-CL synthesis can be selected between ε-caprolactam molecules from table 1 bearing functional group where covalent bonding of FR molecule is feasible. In Atherton-Todd reaction of α-amino-ε-caprolactam and DOPO, DOPO-CL phosphonamidate comonomer is obtained. In different embodiments different phosphorus compounds can be used i.e. DOPO, dimethylphosphite, dibenzylphosphite, diphenylphosphite . . . .

TABLE 1

| Substituted CL | 3-R 3-R' | 4-R 4-R' | 5-R 5-R' | 6-R 6-R' | 7-R 7-R' |
|---|---|---|---|---|---|
| a | Cl H | H H | H H | H H | H H |
| b | Cl Cl | H H | H H | H H | H H |
| c | H H | H H | CH$_3$ CHCl$_2$ | H H | H H |
| d | H H | H H | CH$_3$ CCl$_3$ | H H | H H |

TABLE 1-continued

| Substituted CL | 3-R<br>3-R' | 4-R<br>4-R' | 5-R<br>5-R' | 6-R<br>6-R' | 7-R<br>7-R' |
|---|---|---|---|---|---|
| e | Br<br>H | H<br>H | H<br>H | H<br>H | H<br>H |
| f | Br<br>Br | H<br>H | H<br>H | H<br>H | H<br>H |
| g | H<br>H | H<br>H | Br<br>H | Br<br>H | H<br>H |
| h | Br<br>H | H<br>H | H<br>H | Ph<br>H | H<br>H |
| i | Br<br>H | H<br>H | H<br>H | H<br>H | Ph<br>H |
| j | H<br>H | H<br>H | H<br>H | H<br>H | CH₂—CH₂—Br<br>H |
| k | I<br>H | H<br>H | H<br>H | H<br>H | H<br>H |
| l | H<br>H | H<br>H | CH₂—I<br>H | H<br>H | H<br>H |
| m | H<br>H | H<br>H | H<br>CH₂—I | H<br>H | H<br>H |
| n | NH₂<br>H | H<br>H | H<br>H | H<br>H | H<br>H |
| o | NH₂<br>H | H<br>H | H<br>H | OH<br>H | H<br>H |
| p | OH<br>Ph | H<br>H | H<br>H | H<br>H | H<br>H |
| q | OH<br>CN | H<br>H | H<br>H | H<br>H | H<br>H |
| r | H<br>H | H<br>H | CH₂OH<br>H | H<br>H | H<br>H |
| s | H<br>H | H<br>H | H<br>CH₂OH | H<br>H | H<br>H |
| t | CH₂CH₂OH<br>H | H<br>H | H<br>H | H<br>H | H<br>H |
| u | H<br>H | H<br>H | OH<br>H | H<br>H | H<br>H |
| v | H<br>H | H<br>H | H<br>OH | H<br>H | H<br>H |
| w | Ph₂C—OH<br>H | H<br>H | H<br>H | H<br>H | H<br>H |
| x | H<br>H | H<br>H | OH<br>H | CH₃<br>H | H<br>H |
| y | H<br>H | H<br>H | H<br>OH | H<br>CH₃ | H<br>H |
| z | H<br>H | H<br>H | H<br>OH | CH₃<br>H | H<br>H |
| B | H<br>H | H<br>H | H<br>H | H<br>H | CH₂CH₂OH<br>H |
| C | H<br>H | OH<br>H | H<br>H | CH₃<br>CH₃ | H<br>H |
| D | NH₂<br>H | H<br>H | H<br>H | CH₃<br>CH₃ | H<br>H |
| E | Cl<br>H | H<br>H | H<br>H | CH₃<br>CH₃ | H<br>H |
| F | Cl<br>H | H<br>H | Ph<br>CH₃ | H<br>H | H<br>H |
| G | Br<br>H | OH<br>CH₃ | H<br>H | H<br>H | H<br>H |
| H | OH<br>CH₃O | Br<br>H | H<br>H | H<br>H | H<br>H |
| I | OH<br>OH | Br<br>H | H<br>H | H<br>H | H<br>H |
| J | H<br>H | OH<br>H | OH<br>H | OH<br>H | H<br>H |
| K | OH<br>H | H<br>H | OH<br>H | COOCH₃<br>H | H<br>H |
| L | Cl<br>Cl | H<br>H | Ph<br>CH₃ | H<br>H | H<br>H |
| M | H<br>H | H<br>H | OCH₃<br>OCH₃ | CH₃<br>CH₂OH | H<br>H |
| N | OH<br>H | OH<br>H | OH<br>H | OH<br>H | H<br>H |

In all of these compounds of Table 1 the two substituents for R and R' for each carbon atom can be positioned either forward or backward (in accordance with Cram representation).

In Table 1 each R and R' group refer to formula (VIII) and "Ph" symbolizes a phenyl group.

In Table 1, the groups that can be substituted by FR moieties are: Br, Cl, $CHCl_2$, $CCl_3$, OH, $CH_2OH$, $CH_2CH_2OH$, $Ph_2C$—OH, $CH_2$—I, $CH_2$—$CH_2$—Br and $NH_2$.

Example 1: Synthesis of α-amino-ε-caprolactam

First part of step (i) is related to synthesis reaction of α-amino-ε-caprolactam where 0.8 mol (146.08 g) of L-lysine hydrochloride is neutralized with 0.8 mmol of NaOH and then 7.2 mols (689.09 g) of $Al_2O_3$ is added, followed by 4 L of 1-hexanol. This mixture is heated preferably in temperature range 156-158° C. and is refluxed preferably for 5 hours. The yield of α-amino-ε-caprolactam, produced by this reaction is above 70%. Cooled reaction mixture can be filtered and hexanol can be reduced under reduced pressure. Light yellow crude material can be obtained.

L-Lysine hydrochloride

α-amino-ε-caprolactam
3-ACLM

ε-caprolactam based precursors for FR comonomer synthesis can be also i.e. halogen or hydroxy functionalized caprolactam, (see Table 1). These kinds of precursors are suitable for i.e. phosphate or phosphonate based FR comonomer obtaining. Also it could be used as starting material in synthesis of its amino derivatives-precursors for synthesis of new phosphonamidate based comonomers.

Example 2: Synthesis of ε-Caprolactam Based DOPO Phosphonamidate, DOPO-CL

Below is the synthesis procedure example for production of α-amino-ε-caprolactam:

DOPO          DOPO-Cl

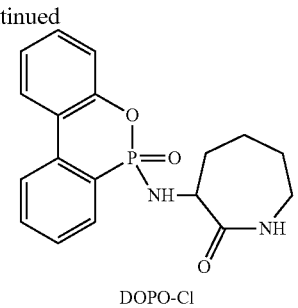

DOPO-Cl

Crude material prepared in Example 1 is then used for flame retardant functionalization of said α-amino-ε-caprolactam and preparation of flame retardant monomers, where 9,10-dihydro-9-oxa-10-phosphaphenanthrene-10-oxide (DOPO) (86.48 g, 0.4 mol) is dissolved in 400 ml of dichloromethane (DCM), stirred and cooled down to temperature 0° C. Sulphuryl chloride (54.24 g, 0.4 mol) dissolved in 200 ml of dichloromethane and added dropwise into the reaction mixture at a rate that the reaction temperature does not exceed temperature 10° C. HCl and $SO_2$ gasses obtained from reaction mixtures are captured by KOH solution. After entire sulphuryl chloride is added to the reaction mixture, solution should be warmed up to room temperature and mixed till bubbling of KOH solution stopped. Reaction is prosecuted after cooling. Separately, into the cooled reaction mixture (on ice bath) 44.52 g of triethylamine (0.44 mol) and 53.8 g of α-amino-ε-caprolactam (0.4 mol) dissolved in 200 ml of dichloromethane were added drop-wised respectively. After those solutions have been added completely the solution is allowed to warm up to room temperature and stirring is continued until all the starting material has been consumed-overnight. After ended reaction, dichloromethane was reduced by evaporation. Crude residue was treated with different organic solvents such as acetone, tetrahydrofurane and dichloromethane for product isolation. Procedure should be repeated till all of the product is isolated. Reaction yield of DOPO functionalized caprolactam (DOPO-CL) obtained as a final product of step (i) was 86.5 g (60%). The formula for DOPO functionalized caprolactam (DOPO-CL) is formula (VII):

(VII)

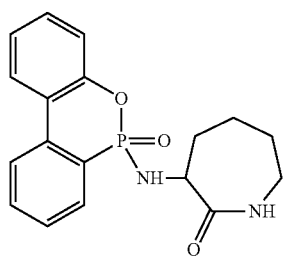

Molecular structure of said DOPO-CL is confirmed by $^1$H NMR presented in FIG. 1.

Example 3: Synthesis of ε-Caprolactam Based Dimethylphosphonamidate, DMP-CL

α-amino-ε-caprolactam (ACLM): 67.3 g (0.525 mol)
dimethylphosphite (DMP): 55.3 g (0.502 mol)
dichloromethane (DCM): 400 mL
sulphuryl chloride: 67.8 g (0.502 mol)
triethylamine (TEA): 56.5 g (0.55 mol)

Crude material prepared in Example 1 is used in similar way as in Example 2 where dimethylphosphite is used instead of DOPO.

Obtained DMP-CL (DMP substituted caprolactam) is of formula:

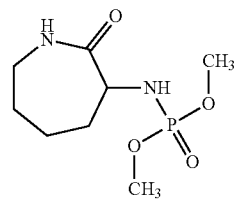

Example 4: Synthesis of ε-caprolactam based dibenzylphosphonamidate, DBP-CL

α-amino-ε-caprolactam (ACLM): 33.6 g (0.26 mol)
dibenzylphosphite (DBP): 65.6 g (0.25 mol)
dichloromethane (DCM): 300 mL
sulphuryl chloride: 33.9 g (0.251 mol)
triethylamine (TEA) 56.5 g (0.55 mol)

Crude material prepared in Example 1 is used in similar way as in Example 2 where dibenzylphosphite is used instead of DOPO.

Obtained DBP-CL (DBP substituted caprolactam) is of formula:

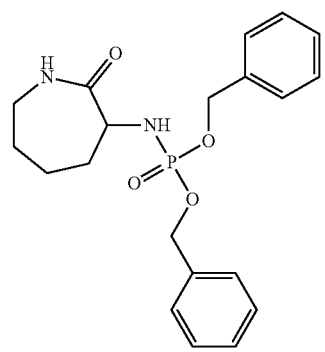 [SMILES: O=C1NCCCCC1NP(=O)(OCc1ccccc1)OCc1ccccc1]

Example 5: Synthesis of ε-Caprolactam Based Diphenylphosphonamidate, DPP-CL

α-amino-ε-caprolactam (ACLM): 33.6 g (0.26 mol)
diphenylphosphite (DPP): 62.5 g (0.25 mol)
dichloromethane (DCM): 300 mL
sulphuryl chloride 33.9 g (0.251 mol)
triethylamine (TEA) 56.5 g (0.55 mol)

Crude material prepared in Example 1 is used in similar way as in Example 2 where diphenylphosphite is used instead of DOPO.

Obtained DPP-CL (DPP substituted caprolactam) is of formula:

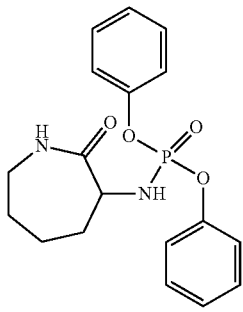 [SMILES: O=C1NCCCCC1NP(=O)(Oc1ccccc1)Oc1ccccc1]

Step (ii) is related to preparation of FR polyamide 6 copolymer in bulk by hydrolytic or anionic ring opening polymerization. ε-Caprolactam and substituted caprolactam (FR-CL) can be added in polytetrafluoroethylene (PTFE sold under the name Teflon®) autoclave reactor or other polymerization tool in different ratio, melted under inert atmosphere and stirred, followed by addition of polymerization initiator (catalytic amount of water and/or aminocaproic acid and/or Sodium caprolactamate) and heated under enhanced pressure preferably over three hours (see FIG. 2). Other examples are presented below.

The polymer obtained can be crushed and refluxed in dichloromethane (DCM), filtrated and then dried in an oven overnight at 90° C. under vacuum, wherein the remaining monomers and short polymers are removed from the bulk polymer, in particular the same step can be done only through reduced pressure.

In polymerization process, the comonomers can be a combination of two or more different FR monomers mentioned above in combination with ε-caprolactam. Given partial polymerization, the copolymers can be heated and incorporated in flame retardant structure again later in a separate follow-up process.

Example 6: Polymerization of Flame Retardant Polyamide 6 by Hydrolytic Polymerization ε-caprolactam, DOPO-CL and $H_2O$ were used in the 94:5:1 weight percent ratio. After uniform melt mixing of ε-caprolactam and DOPO-CL with stirring and under argon atmosphere, water as initiator was added and co-polymerization reaction was carried out at 230° C. for 6 h.

Example 7: Polymerization of Flame Retardant Polyamide 6 by Hydrolytic Polymerization ε-caprolactam, DOPO-CL and $H_2O$ were used in the 89:10:1 weight percent ratio. After uniform melt mixing of ε-caprolactam and α-DOPO-ε-caprolactam with stirring and under argon atmosphere, water as initiator was added and co-polymerization reaction was carried out at 230° C. for 6 h.

Example 8: Polymerization of Flame Retardant Polyamide 6 by Hydrolytic Polymerization ε-caprolactam, DOPO-CL and $H_2O$ were used in the 79:20:1 weight percent ratio. After uniform melt mixing of ε-caprolactam and DOPO-CL with stirring and under argon atmosphere, water as initiator was added and co-polymerization reaction was carried out at 230° C. for 6 h.

Example 9: Polymerization of Flame Retardant Polyamide 6 by Addition of Aminocaproic Acid as Polymerization Initiator ε-caprolactam, DOPO-CL and amino caproic acid were used in the 89:10:1 weight percent ratio. After uniform melt mixing of α-caprolactam and DOPO-CL with stirring and under argon atmosphere, amino caproic acid as initiator was added and co-polymerization reaction was carried out at 230° C. for 6 h.

Example 10: Polymerization of Flame Retardant Polyamide 6 by Addition of Sodium ε-Caprolactamate as Polymerization Initiator ε-caprolactam, DOPO-CL and sodium ε-caprolactamate were used in the 89:10:1 weight percent ratio. After uniform melt mixing of ε-caprolactam and DOPO-CL with stirring and under argon atmosphere, sodium ε-caprolactamate as initiator was added and co-polymerization reaction was carried out at 230° C. for 6 h.

Example 11: Polymerization of Flame Retardant Polyamide 6 by Hydrolytic Polymerization ε-caprolactam, DOPO-CL, DOPO2-phenethyl (FED) and $H_2O$ were used in the 89:5:5:1 weight percent ratio. After uniform melt mixing of ε-caprolactam and DOPO-CL and DOPO2-phenethyl (FED) with stirring and under argon atmosphere, water as initiator was added and co-polymerization reaction was carried out at 250° C. for 10 h.

Example 12: Polymerization of Flame Retardant Polyamide 6 by Hydrolytic Polymerization ε-caprolactam, DOPO-CL, DOPO2-naphthalene (NED) and $H_2O$ were used in the 89:5:5:1 weight percent ratio. After uniform melt mixing of ε-caprolactam and DOPO-CL and DOPO2-naphthalene with stirring and under argon atmosphere, water as initiator was added and co-polymerization reaction was carried out at 250° C. for 10 h.

Example 13: Polymerization of Flame Retardant Polyamide 6 by Hydrolytic Polymerization ε-caprolactam, DOPO2-phenethyl (FED) and $H_2O$ were used in the 89:10:1 weight percent ratio. After uniform melt mixing of ε-caprolactam and DOPO2-phenethyl (FED) with stirring and under argon atmosphere, water as initiator was added and co-polymerization reaction was carried out at 250° C. for 10 h.

Example 14: Polymerization of Flame Retardant Polyamide 6 by Hydrolytic Polymerization ε-caprolactam, DOPO2-naphthalene and $H_2O$ were used in the 89:5:5:1 weight percent ratio. After uniform melt mixing of ε-caprolactam and DOPO2-naphthalene (NED) with stirring and under argon atmosphere, water as initiator was added and co-polymerization reaction was carried out at 250° C. for 10 h.

Example 15: Melt-Spinning

The DOPO/PA6 was grounded into pellets and dried at 100° C. for 3 hours before the processing. The DOPO/PA6 composite multifilament yarns were produced in a melt-spinning process using a laboratory melt-spinning device (sold by the company EXTRUSION SYSTEM®, Ltd. (Bradford, Great Britain)). Pellets were filled in a screw extruder, which was turning and acting with friction on them. The spinning temperature for DOPO/PA6 was set to 210° C. in all zones, i.e., the extruder, spinning pump and spin pack. The melt passed through a 35 µm filter. The spinneret for multifilament spinning had 10 holes with diameters of 0.35 mm. The melt was extruded through the holes of the spin nozzles, cooled in the cooling zone in air at 20° C. and the created multifilament yarn was wounded onto a first galette at the velocity of 50 m/min or onto tubes before knitting.

Good mechanical properties of the spun fibres enabled successful knitting, which enabled production of a flame retardant PA6 textile with instantaneous flame extinguishment and UL-94 test V-0 ratings.

During polymerization process in which unmodified ε-caprolactam is polymerized, copolymers presented above can be used as flame retardant additives, although copolymers can be used without pre-treatment with water or reduced pressure, so that polymerization reaction can be optimally adjusted.

During polymerization process in which unmodified €-caprolactam is polymerized, copolymers presented above or co-oligomers can be used as flame retardant additives without and with the presence of the DOPO2-phenethyl and DOPO2-naphthalene, although copolymers can be used without pre-treatment with water or reduced pressure, so that polymerization reaction can be optimally adjusted.

TABLE 2

Relative viscosity, melting temperature and crystallization temperature for selected examples

| Example | Relative viscosity (–) | Crystallisation temperature (° C.) | Melting temperature (° C.) | ΔHm2 (J/g) |
|---|---|---|---|---|
| 6 | 1.6 | 163 | 209 | 58 |
| 7 | 1.5 | 155 | 202 | 49 |
| 8 | 1.4 | 139 | 187 | 33 |
| 9 | 1.6 | 146 | 199 | 45 |
| 10 | 1.1 | 152 | 187 | 37 |
| 11 | 2.0 | 166 | 203 | 52 |

ΔHm2 is the latent heat of melting of said polyamide 6 copolymer.

However, the proportion of repeating units of polyamide 6 having an A moiety (flame retardant moiety) in the obtained copolymer is a significant parameter for successful flame retardant action. Flame retardant polyamide 6 possesses flame retardant properties preferably if the concentration of flame retardant comonomer (i.e. FR-CL) in flame retardant structure contains at least 0.01 and/or not more 10 wt %, it being preferred for the flame retardant polyamide to contain 0.01 to 1.3 wt % of phosphorous. The high 8 wt % of FR monomer is essential for uniformly distribution of flame retardant comonomer in polymeric structure in order that flame retardant polyamide of invention have non-flammable characteristic evaluated by UL94 protocol resulted.

However, it is also possible to apply comonomer in smaller concentrations that contain 0.01 to 0.8 wt % of flame retardant monomer in FR PA6 polymer structure, wherein low quality of non-easy flammability is achieved evaluated by UL94 protocol.

During masterbatch production in step (iii) PA6 polymers can be mixed with crushed FR copolymer powders, wherein the concentration of phosphorous may be identified between 0.01 and 1.3 wt %.

However, invention opens up further possibilities for modification of FR PA6 including modified platelets graphene and/or multi walled carbon nanotubes for improvement of flame retardant polyamide 6 conductivity and/or antibacterial properties where carbon based and/or silver based additives are added in melt.

In accordance with the invention flame retardant polyamide 6 can be prepared by extruding and/or melt-spinning/winding process and to be taken off under spinneret speed from 500 m/min to 1500 m/min in multifilament yarn. Moreover, it is advantageous that produced filaments or multifilaments can be used for producing textile structures, more especially knitted textile, woven and nonwoven fabrics.

Moreover, it is advantageous that flame retardant polyamide 6 can be used as additive for other polyamides, wherein the concentration of phosphorous may be adjusted between 0.01 wt % and 1.3 wt %.

Example 16: Production of Fibres

FIG. 7 shows a photograph of FR PA6 multifilament yarn (E) and a photograph of FR PA6 composite of knit-fabric (F).

Commercial polyamide 6 sold under the name ECONYL® by the company AquafilSLO® (Ljubljana, Slovenia) and FR copolyamide 6 can be used in a weight ratio 7:1. This is done using melt spinning unit, comprises a single-screw extruder, a melt spinning pump and 10 nozzles and also high speed winder, with which the produced fibres are elongated and produced in final thickness. The final yarn consists of 10 individual filaments with the thickness between 20 µm and 120 µm.

However, testing of burning behaviour of formed-loop knit produced from filaments mentioned above resulted in unignited knit even a Bunsen burner flame was applied several times for 8 seconds.

FIG. 3 shows a sheet specimen prepared by the FR PA6 copolymer material included 10 wt % DOPO-functionalized ε-caprolactam before (A) and after (B and C) the UL94 standard test. The sheet does not burn (B) and the melted drop from the specimen does not ignite the cotton indicator (C). The FR PA6 copolymer material is classified V-0.

The invention can be varied in many ways with respect to the embodiments and variations described above and in the examples and illustrated in the figures. Further, a polyamide 6 copolymer according to the invention can be added to other polymers and act as a flame retardant for these polymers.

The invention claimed is:

1. Method for the preparation of a polyamide 6 copolymer, wherein a copolymerization reaction is carried out between:

at least one caprolactam of formula (I):

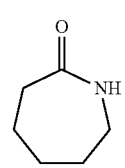

(I)

at least one caprolactam, named substituted caprolactam, having a cycle formed of six carbon atoms and one nitrogen atom in which one of said carbon atoms, named $C_2$, is linked by a double bond to an oxygen atom and at least one of said carbon atoms that is distinct from said $C_2$ is covalently linked to at least one A moiety, said A moiety being:

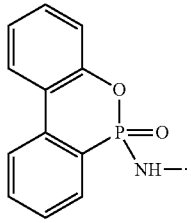

2. Method according to claim 1, wherein prior to carrying out said copolymerization reaction, said substituted caprolactam is prepared from an α-amino-ε-caprolactam.

3. Method according to claim 1, wherein said copolymerization reaction is carried out in argon atmosphere.

4. Method according to claim 1, wherein copolymerization reaction is carried out at a temperature between 170° C. and 300° C.

5. Method according to claim 1, wherein said copolymerization reaction is carried out with 80% to 95% by weight of caprolactam of formula (I) and 5% to 20% of said substituted caprolactam of Formula (VII)

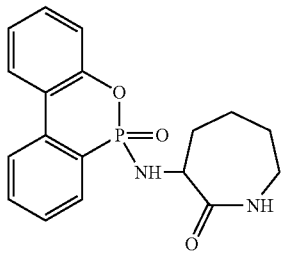

(VII)

compared to the total mass of said caprolactam of formula (I) and said substituted caprolactam of Formula (VII).

6. Method according to claim 1, wherein said copolymerization reaction is carried out with water as an initiator of said copolymerization reaction.

7. Polyamide 6 copolymer containing at least 8% by weight of repeating units, named polyamide 6 substituted repeating units, of formula:

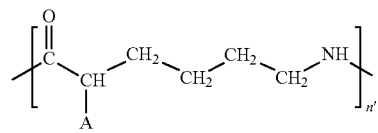

in which n' designates the number of said substituted repeating units in said polyamide 6 copolymer, wherein A is

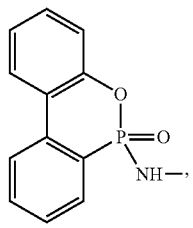

compared to the total weight of said polyamide 6 copolymer, as determined by inductively coupled plasma mass spectrometry.

8. Polyamide6 copolymer according to claim 7, wherein it is formed of filaments.

9. Polyamide 6 copolymer according to claim 7, wherein it is formed of filament yarn.

10. Composition comprising a polyamide 6 copolymer according to claim 7 and at least one additive chosen from the group formed of 6H-dibenz[c,e][1,2]oxaphosphorin,6'6-(1,2-phenethyl)bis-,6'6-dioxide of formula:

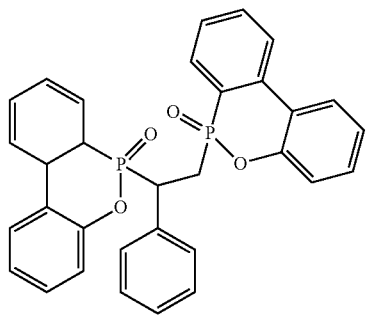 [SMILES: O=P1(CC(c2ccccc2)P2(=O)Oc3ccccc3C3C=CC=CC32)Oc2ccccc2-c2ccccc21]

and 6H-dibenz[c,e][1,2]oxaphosphorin,6'6-(1,2-naphthalene)bis-,6'6-dioxide of formula:

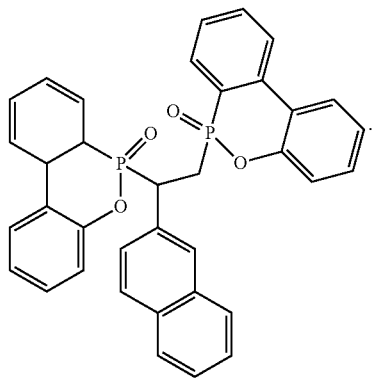 [SMILES: O=P1(CC(c2ccc3ccccc3c2)P2(=O)Oc3ccccc3C3C=CC=CC32)Oc2ccccc2-c2ccccc21]

11. Method for the preparation of filaments of a polyamide 6 copolymer, wherein:

a polyamide 6 copolymer containing at least 8% by weight of repeating units, named polyamide 6 substituted repeating units, of formula:

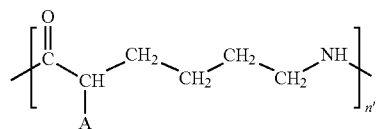
in which n' designates the number of said substituted repeating units in said polyamide 6 copolymer, wherein A is
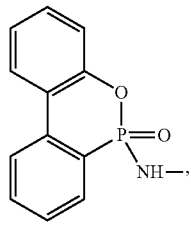
compared to the total weight of said polyamide 6 copolymer, as determined by inductively coupled plasma mass spectrometry,
is provided and,
a filament formation step being melt-spinning or extrusion of said polyamide 6 copolymer is carried out.
* * * * *